United States Patent [19]

Keller

[11] Patent Number: 5,519,455
[45] Date of Patent: May 21, 1996

[54] KINESCOPE DRIVER WITH OUTPUT LOAD RESISTOR COUPLED TO KINESCOPE CATHODE VIA TWO PATHS INCLUDING A FURTHER RESISTOR AND A SERIES COUPLED BUFFER AMPLIFIER AND CAPACITOR

[75] Inventor: Anton W. Keller, Zurich, Switzerland

[73] Assignee: RCA Thompson Licensing Corporation, Princeton, N.J.

[21] Appl. No.: 234,014

[22] Filed: Apr. 28, 1994

[51] Int. Cl.$^6$ .................................................. H04N 5/202
[52] U.S. Cl. ............................................. 348/674; 348/675
[58] Field of Search ..................................... 348/674, 675, 348/678, 679, 683, 379, 380, 707, 805, 728; 328/364; 358/164; 315/383; H04N 5/202, 9/69, 5/52, 5/57, 5/68

[56] References Cited

U.S. PATENT DOCUMENTS

| | | | |
|---|---|---|---|
| 4,096,517 | 6/1978 | Hinn | 358/40 |
| 4,858,015 | 8/1989 | Furrey | 358/242 |
| 5,083,198 | 1/1992 | Haferl et al. | 358/32 |

Primary Examiner—Safet Metjahic
Assistant Examiner—Nina N. West
Attorney, Agent, or Firm—Joseph S. Tripoli; Peter M. Emanuel; Richard G. Coalter

[57] ABSTRACT

A current source (70) is coupled to supply an output current to a circuit node (60) proportional to a video input signal (R). A first resistor (65), coupled between the circuit node (60) and a source of supply voltage (68), develops an amplified video signal which is coupled from the circuit node to the cathode (K1) of a kinescope (20) via a second resistor (85). A capacitor (100 or 110) is provided having a first electrode coupled to the cathode (K1) of the kinescope (20) and having a second electrode coupled to the circuit node (60) via an amplifier(90). Advantageously, the combined resistance of the two resistors imparts gamma correction to the kinescope, the capacitor and amplifier compensate for stray capacitance associated with the cathode without subjecting low frequency components to any possibility of distortion in the amplifier. Additionally, the capacitance (110) may be varied as a function of the beam current for stabilizing the overall driver amplifier frequency response.

13 Claims, 4 Drawing Sheets

KINESCOPE DRIVER WITH OUTPUT LOAD RESISTOR COUPLED TO KINESCOPE CATHODE VIA TWO PATHS INCLUDING A FURTHER RESISTOR AND A SERIES COUPLED BUFFER AMPLIFIER AND CAPACITOR

FIELD OF THE INVENTION

This invention relates to television systems generally and particularly to kinescope cathode driver apparatus with provisions for providing gamma correction.

BACKGROUND OF THE INVENTION

In an ideal television system the light output produced by a kinescope would be linearly related to the light applied to a camera pick-up tube. In practical systems, neither the camera tube or the display tube are linear devices. In other words, the signal voltage produced by a camera tube is not linearly related to the light that is detected and the light produced by a kinescope is not linearly related to the cathode drive voltage applied to it. The relationship between light input and signal output for the camera tube, and the relationships between signal input and light output of the picture tube, are both commonly expressed by the term "gamma" which, simply stated, is the exponent or "power" to which an input function (X) is raised to produce an output function (Y). If, for example, an input function X is raised to the first power (gamma=1) to produce an output function, then the two functions are said to be linearly related. If the output varies as the square of the input function, the value of the exponent (gamma) is equal to "2". If the output varies as the square root of the input function, the "gamma" or exponent equals 0.5. Gamma, in other words, is simply a measure of curvature of a transfer function, FIG. 1 shows the gamma of various aspects of a video signal transmission system, with curve 100 representing the transfer characteristic of the transmission side, curve 102 representing the transfer characteristic of the picture tube (kinescope or "CRT"), and curve 104 representing the overall transfer characteristic. The transmitted video signals of the NTSC, PAL and SECAM television standards have a gamma of about 0.45 to 0.5 while the picture tube (kinescope) of color television receivers have a gamma of about 2.8 to 3.1. As a result, the overall transfer curve (light into the camera to light output from the picture tube) is not linear and the overall gamma is, in practice about 1.35 instead of a unity (1.0) gamma. This implies that the exponential transfer characteristic of the picture tube is not fully compensated, leading to compression of dark picture portions of the display. Such compression causes picture details near black to be lost, and colored areas to fade to black. Concurrently, whites are excessively amplified with respect to the dark portions to the point of often reaching picture tube saturation and blooming.

A linear overall transfer characteristic avoids the problem of black compression and can be obtained by an additional gamma correction of about 0.8 in each of the red, green, and blue (R, G and B) signal processing circuits in the television receiver. However, picture tubes have a relatively small dynamic range of light output which can not be enlarged without reaching picture tube saturation causing blooming. Therefore, gamma correction to increase amplification of dark image areas can cause a signal compression of the high signal whites. This is illustrated in FIG. 2A showing a partially gamma corrected ramp signal in which the gain for signals near black level is increased. It is desirable, however, that peak white be kept at the same level as in the uncorrected case, the dashed line, to avoid picture tube blooming. For this to occur, the slope of the upper portion of the ramp signal may be reduced as shown in FIG. 2B. This corrects the black compression problem while avoiding the problem of "blooming" (excessive whites).

Reducing the upper portion of the ramp signal to avoid blooming, however, can create another problem. The viewer perceives the reduced signal as a lack of contrast in gray to white picture areas resulting in "washed out" appearing pictures. In such an event, the improvement of contrast of low-brightness portions of the image by gamma correction is obtained at the expense of high brightness contrast deterioration.

There are, generally speaking, two conventional approaches to gamma correction. One approach is to apply non-linear processing to the video signal in the driver circuitry as exemplified, for example, by Haferl et al. in U.S. Pat. No. 5,083,198 which issued Jan. 21, 1992. In an embodiment of the Haferl et al. apparatus, a video signal is divided into low and high amplitude portions, the latter are high pass filtered and then the original video signal, the low amplitude portion and the high pass filtered high amplitude portion are combined for application to a kinescope. Images displayed include gamma correction for black to gray picture areas and boosted detail for gray to white picture areas.

The other approach to gamma correction is to apply linear processing to the video signal and rely upon the non-linear impedance characteristics of the kinescope cathode for gamma correction as exemplified, for example, by Furrey in U.S. Pat. No. 4,858,015 which issued Aug. 15, 1989. In an embodiment of the Furrey apparatus a video signal is linearly amplified in a cascode amplifier. The amplifier output impedance is reduced by coupling the amplifier load resistor to the input of a voltage follower amplifier comprising a cascade complementary emitter follower buffer amplifier. The output of the voltage follower amplifier is coupled to the kinescope cathode via a parallel connection of a resistor and a capacitor. The resistor, in combination with the non-linear resistive portion of the cathode impedance, provides gamma correction. However, the resistor, in combination with the stray capacitance of the cathode, creates an undesirable frequency response pole at a relatively low frequency (i.e., it acts as a low pass filter). This tends to reduce the high frequency detail of displayed images. The inclusion of a by-pass capacitor in parallel with the resistor tends to restore the high frequency response by by-passing high frequency components around the gamma correction resistor. The complementary emitter follower (buffer) amplifier provides a low impedance source for driving the by-pass capacitor.

SUMMARY OF THE INVENTION

In the two approaches to gamma correction described above, the second approach has the virtue of relative simplicity, economy and improved reliability (due to requiring fewer circuit elements).

However, it is herein recognized that the gamma corrected video signal is subject to cross-over distortion characteristic of the complementary emitter follower buffer amplifier and this distortion exists over essentially the full video bandwith. The present invention is directed, in a first respect, to reducing such distortion.

Kinescope driver apparatus embodying the invention includes a circuit node and a current source coupled to supply an output current to the circuit node proportional to a video input signal. A first resistor, coupled between the circuit node and a source of supply voltage, develops an amplified video output signal which is coupled from the circuit node to the cathode of a kinescope via a second resistor to provide a source impedance for the cathode not less than the sum of values of the two resistors. A capacitor is providing having a first electrode coupled to the cathode of the kinescope and having a second electrode coupled to the circuit node via an amplifier.

Advantageously, the first and second resistors, in combination, impart gamma correction to the kinescope. Also, DC and low frequency components of the video signal never pass though the second amplifier and so are free of any possible distortion in the second amplifier.

A further advantage is that since most of the power of the video signal is in the DC and low frequency portion of the spectrum, the second amplifier power dissipation is relatively low thus reducing the cooling requirements.

In another embodiment of the invention herein described, the capacitance is varied as a function of the beam current which, advantageously, tends to add stability to the overall driver amplifier frequency response for variations in the beam current.

A method of applying gamma correction to a kinescope, in accordance with the invention, comprises the steps of (i) generating a current proportional to a video input signal; (ii) applying the current to a first resistor for producing an amplified video signal; (iii) coupling the amplified video signal to a cathode of a kinescope via a second resistor to provide a source resistance for the cathode not less than the sum of values of the first and second resistors; and (iv) coupling a common connection of the first and second resistors to an input of an amplifier and coupling an output of the amplifier to the cathode of the kinescope via a capacitor.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 1:
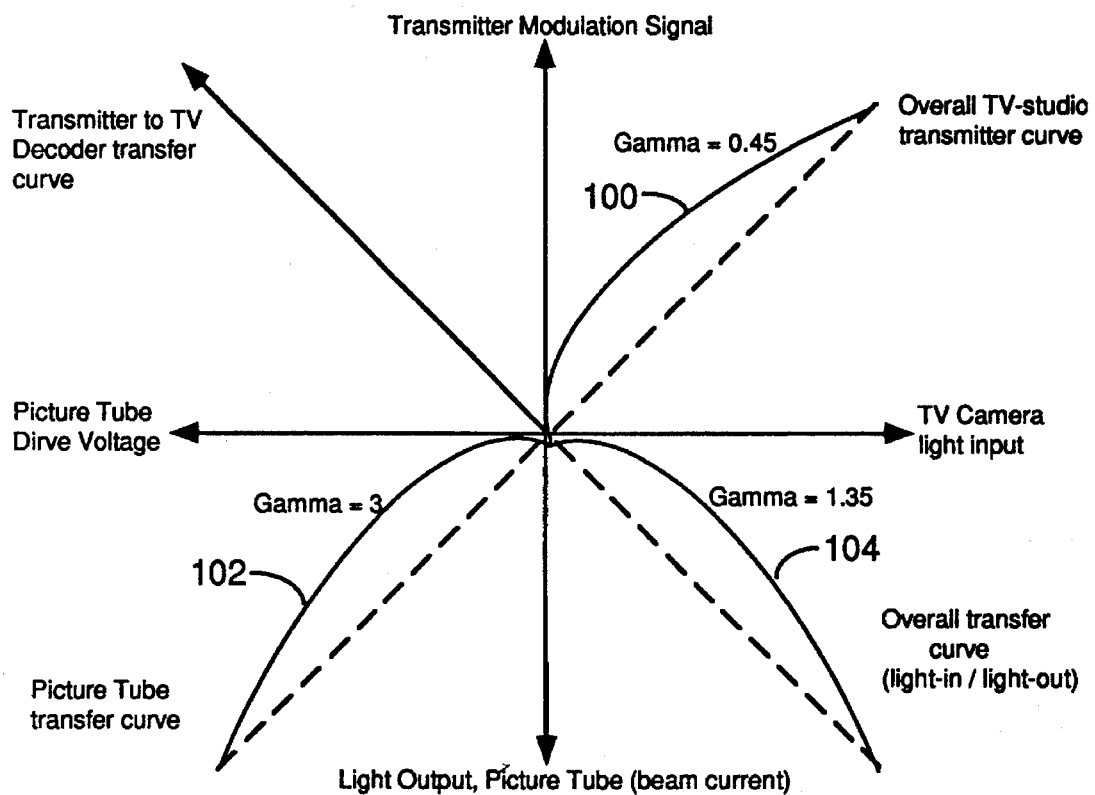
FIG. 1 is a diagram showing exemplary transfer characteristics and gamma values for a television transmitter, a television receiver and the overall television system including the transmitter and receiver.
Figures 2A, 2B:
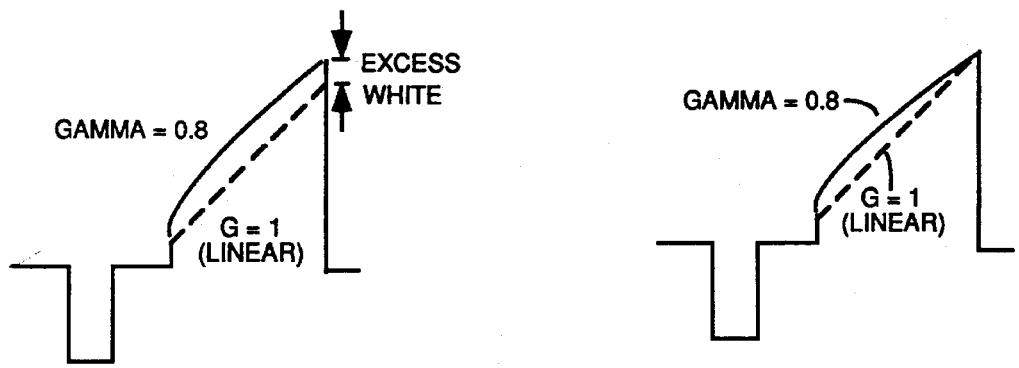
FIGS. 2A and 2B are diagrams illustrating gamma correction.
Figure 3:
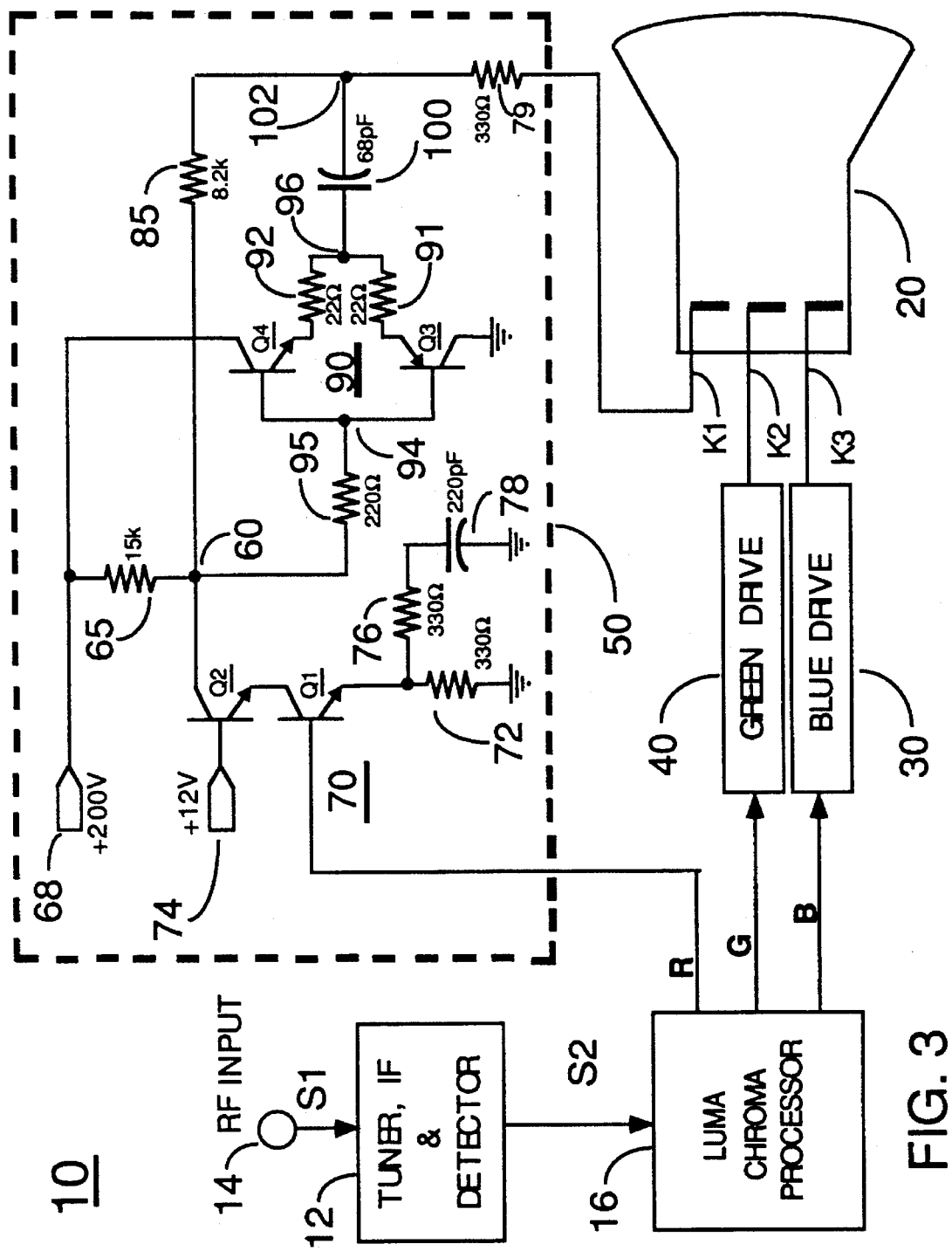
FIG. 3 is a block diagram, partially in schematic form, of a television receiver including a gamma corrected kinescope driver amplifier embodying the invention.

The television receiver 10 of FIG. 3 includes a tuner, intermediate frequency amplifier (IF) and detector unit 12 having an RF input terminal 14 for receiving an RF input signal S1 from a suitable source (e.g., broadcast, cable, VCR or the like) and provides a base band video output signal S2 to a chrominance/luminance signal processing unit 16 that provides component red (R), green (G) and blue (B) video output signals for display by a kinescope 20. To provide high voltage drive signals to the cathodes K1, K2 and K3 of kinescope 20, the R, G and B drive signals are applied to respective ones of the kinescope cathodes K1, K2 and K3 via respective kinescope driver amplifiers 50, 40 and 30. The driver amplifiers are identical and so only the details of one (driver 50) are illustrated. For completeness, exemplary element values are included for each circuit element in this specific embodiment.

Driver 50 (outlined in phantom) includes a circuit node 60 and a current source 70 coupled to supply an output current to the circuit node 60 proportional to the value of the video input signal ("Red" in this case) applied to the current source 70.

The current source 70 comprises a first transistor Q1 having a base electrode to which the (R) video input signal is applied, having an emitter electrode coupled to a source of reference potential (e.g., ground in this example) via an emitter resistor 72 and having a collector electrode coupled to circuit node 60 via the conduction path of a common base amplifier comprising a second transistor Q2. Specifically, transistor Q2 is connected at the base thereof to a source of supply voltage 74 (e.g., +12 volts), at the emitter thereof to the collector of transistor Q1 and at the collector thereof to the circuit node 60. Two further elements of the current source 70 are a series connected resistor 76 and capacitor 78 coupled in parallel with the emitter resistor 72. The time constant of this by-pass path is selected to provide high frequency boost for the current source 70 in the upper portion of the luminance signal band (e.g., about 4 MHz).

Circuit node 60 is coupled to a source 68 of relatively high supply voltage +V (e.g., about 200 volts) by a resistor 65 and is coupled to the cathode electrode K1 of kinescope 20 by a resistor 85. The values of these two resistors are selected, as explained later, to impart gamma correction to images displayed by kinescope 20 but the relatively high total resistance tends to reduce the driver amplifier bandwidth and so tends to reduce the detail of displayed images. An additional resistor 79 (e.g., 330 Ohms) coupled between an output 102 and the cathode K1 provides arc protection for amplifier 50.

The remaining elements of driver amplifier 50 correct the bandwidth reduction problem noted above and comprise a buffer amplifier 90 and a capacitor 100. Specifically, amplifier 90 has a output 96 coupled to the cathode K1 of kinescope 20 via the capacitor 100 and has an input 94 coupled to the circuit node 60 via a resistor 95. Amplifier 90 is a unity gain voltage follower of the complementary emitter follower type and includes a pair of complementary transistors Q3 (PNP) and Q4 (NPN). Transistor Q3 transistor has collector and base electrodes coupled to ground and to input 94, respectively, and an emitter coupled to output 96 via a resistor 91. Transistor Q4 has collector and base electrodes coupled to supply 68 and input 94 and has an emitter coupled to output 96 via a resistor 92. The emitter resistors 91 and 92 are protection resistors which limit the maximum current flow though the series connected conduction paths of transistors Q3 and Q4 during signal transitions when one transistor is turning on while the other is turning off. Under steady state conditions no current flows and so there is no quiescent power dissipation. The purpose of resistor 95 is to limit the transient base current flow to transistors Q3 and Q4 under transient conditions and to provide additional isolation of the load capacitor 100. The effective capacitance component at the input node is quite low being approximately equal to the load capacitance scaled down by a factor approximately equal to the forward current gain of the transistors. The additional isolation of this capacitance provided by resistor 95 ensures that capacitor 100 is fully isolated from circuit node 65. This isolation avoids a loss of gain and an unwanted additional low frequency pole that otherwise would result if capacitor 100 were to be directly connected to circuit node 65.

In operation, the current source 70 supplies an output current to the circuit node 60 that is proportional to the value of the red (R) video input signal provided by luma chroma processor 10. This results because transistor Q1 regulates the voltage across emitter resistor 72 to be proportional to the voltage of the red (R) signal applied to its base electrode. Since the voltage across resistor 72 follows the red signal, the current through it and thus the collector current delivered to circuit node 60 is proportional to the red gun signal voltage. It will be noted that the collector current differs slightly from the emitter current of transistor Q1 by the amount of the base current. This difference is small and may be eliminated completely if field effect transistors were used instead of the bipolar transistors shown.

The function of the common base connected transistor Q2 is to isolate the collector electrode of transistor Q1 from voltage variations to suppress the Miller effect and thus extend the bandwidth of the overall amplifier formed by load resistor 65 and current source 70. In this example, transistor Q2 regulates the collector voltage of transistor Q1 at about 12 volts as determined by the connection of its base electrode to the source of supply voltage 74. The current provided by current source 70 is boosted in the upper end of the video band (e.g., around 4 MHz) by the emitter resistor 72 by-pass network comprising resistor 76 and capacitor 78.

Resistor 65, coupled between the circuit node 60 and the source of supply voltage 68, develops an amplified video output signal in response to the current provided by source 70. The gain of the amplifier formed by the combination of current source and resistor 65 is, to a first approximation, determined by the ratio of the value of resistor 65 divided by the value of resistor 72. The actual gain is somewhat less and is not linear due to the non-linear loading effects of the resistor 85 (which is linear) and cathode K1 (which has a non-linear real component of dynamic impedance). It is the non-linearities of the cathode load which provides gamma correction as will now be explained.

Resistor 85, coupled between the circuit node 60 and the cathode K1 of kinescope 20, applies the amplified video signal developed by resistor 65 to the cathode electrode. Importantly, the values of the resistor 65 and the resistor 85 are selected to provide a combined or total resistance sufficient to impart gamma correction to images displayed by the kinescope 20. For this purpose, resistors 65 and 85 are selected to have a total or combined resistance value between the maximum and minimum values of dynamic resistance presented by the cathode K1 of kinescope 20. The maximum dynamic resistance of the cathode occurs when the cathode is driven to cut-off potential to produce a black level image. The minimum value of the resistance of cathode K1 occurs when the cathode is driven to produce a peak white output image on kinescope 20.

Another way of viewing the gamma correction discussed above is to view the combination of current source 70 and resistors 65 and 85 as being an amplifier having a fixed output impedance that is about half way between the impedance variations of the kinescope cathode electrode. For a value in this range, the driver amplifier essentially acts as a current source when the cathode impedance is low (white level signals) and so limits drive to the cathode and as a voltage source when the cathode impedance is high (black level signals). As a result, more drive is applied for signal levels near black level than white level thus improving contrast for relatively dark scenes.

Unfortunately, the relatively high total resistance (resistor 65 plus resistor 85) of the gamma correction resistors, in combination with the stray capacitance associated with the cathode electrode of kinescope 20, forms effectively a low pass filter producing an unwanted frequency response pole at a very low frequency. In this example of the invention the total resistance is 23.2 k-Ohms. If the stray capacitance is, illustratively, about 15 pico-Farads, the undesired pole would be located below a half mega-Hertz. This tends to diminish the bandwidth of the driver amplifier 50 and in so doing tends to reduce the detail of images displayed by kinescope 20.

The diminished bandwidth problem noted above is counteracted by buffer amplifier 90 having its output 96 coupled to cathode K1 via capacitor 100 and having its input 94 coupled to the circuit node 60. This circuit provides a low impedance source for high frequency signal components to flow to cathode K1 without presenting any significant capacitive load to circuit node 65 and advantageously, without subjecting DC and low frequency components of the video signal to any cross over distortion.

In more detail, recall that the combination of current source 70, which is linear, and load resistor 65, which is also linear, provides linear amplification of the red video signal. The current source is operated in a class-A mode (meaning that there is conduction throughout 360 degrees of an electrical cycle, the transistor is never driven to cut-off condition) and so there is essentially no distortion in the amplified video signal delivered to the kinescope cathode K1 via resistor 85. While amplifier 90 does exhibit crossover distortion, this is limited to only the high frequency augmentation component of the video signal conducted by capacitor 100 and, as a practical matter, would not be visible on images displayed by kinescope 20. Crossover distortion would however be visible if the main video signal were allowed to pass though a buffer amplifier to resistor 85. This is avoided completely, as well as the undesirable capacitive loading effects on circuit node 65 previously discussed by the connections of capacitor 100 and amplifier 90 noted above.

To briefly summarize the foregoing, in the kinescope driver of FIG. 3 the current source 70 supplies an output current to the circuit node 65 proportional to the value of the video input signal (red) applied to the current source. The common base transistor Q2 applies the current of current source 70 to the resistor 65 for producing an amplified video signal. Resistor 85 couples the amplified video signal to the cathode K1 of the kinescope 20 for producing images. The sum of the values of resistors 65 and 85 is selected to impart gamma correction to the images displayed by the kinescope 20 but tending to reduce the image detail. The detail is restored by coupling a first plate of the capacitor 100 to the cathode electrode K1 of kinescope 20 and coupling a second plate of the capacitor 100 to a common connection (i.e., node 60) of the resistors 65 and 85 via the amplifier 90.

Figure 4:
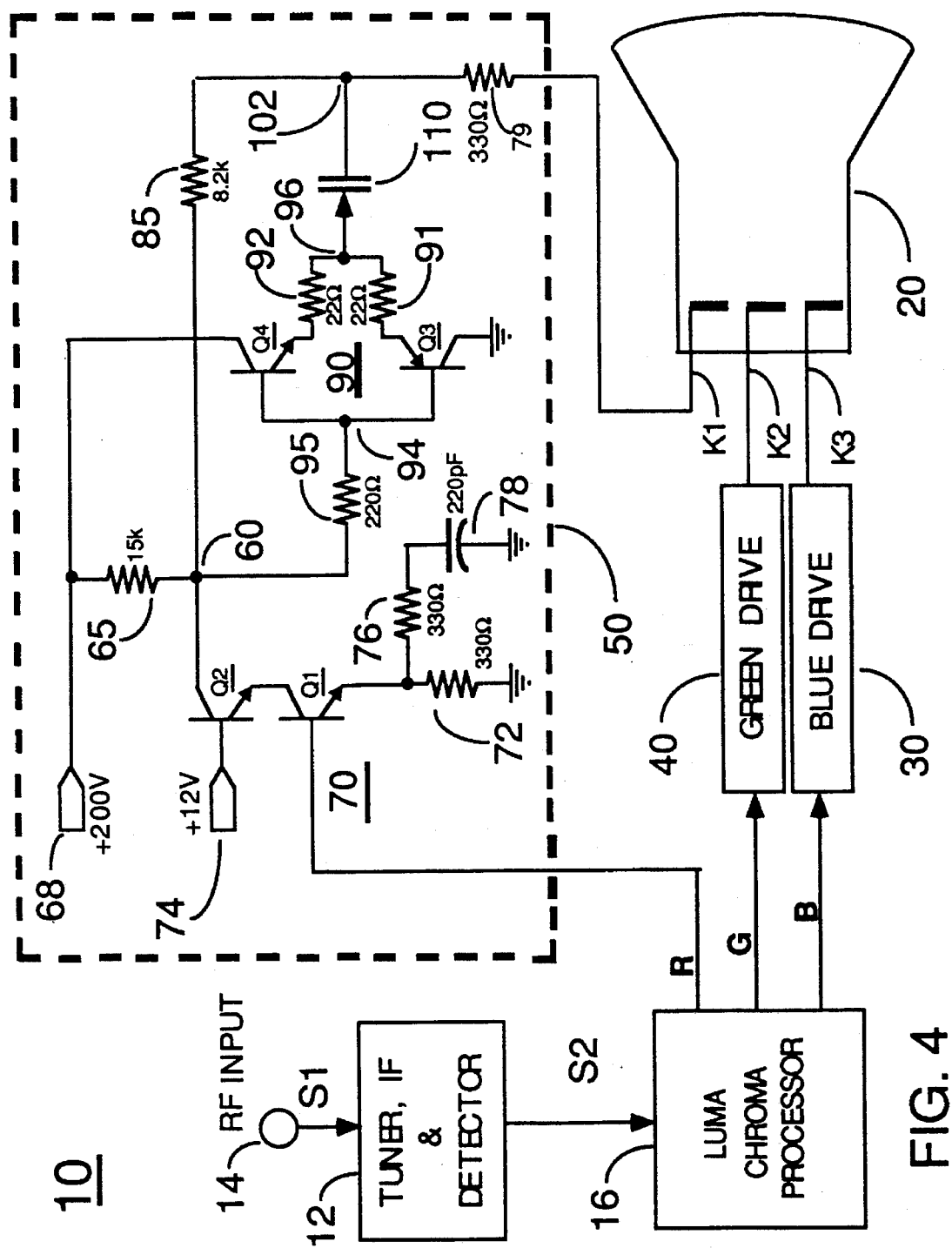
FIGS. 4 and 5 illustrate modifications of the kinescope driver amplifier of FIG. 3.

In the modified kinescope driver amplifier of FIG. 4, the capacitor 100 has been replaced by a variable capacitor 110 implemented here by a varactor or "varicap" diode connected at the anode thereof to output 96 of buffer amplifier 90 and at the cathode thereof to the cathode K1 of kinescope 20.

In operation, the cathode current flowing though resistor 85 produces a bias voltage for the variable capacitance diode 110. Accordingly, as the kinescope beam current increases the capacitance decreases and vice versa. This variation in capacitance tends to compensate for variations in the resistive portion of the cathode impedance with changes in beam current and results in stabilized high frequency response.

In more detail, recall that the cathode dynamic impedance includes a real (resistive) portion which varies inversely with beam current and an imaginary (capacitive) portion represented by the stray capacitance associated with the cathode and which does not vary with the beam current. As the beam current increases, the resistive component decreases and so the "corner frequency" or response pole due to the stray capacitance tends to increase in frequency. This change means that less high frequency drive is needed to maintain a constant frequency response for the overall system. This reduction in high frequency compensation drive, for increasing beam current is provided by the variable capacitance diode 110 which receives increasing bias with increasing beam current and so exhibits a decrease in capacitance. This change is in a sense to stabilize the overall frequency response for changes in brightness level of displayed images.

Various other changes and modifications may be made within the scope of the invention as defined by the appended claims. For example, the cross-over distortion of amplifier 90 may be reducing by biasing transistors Q3 and Q4 to conduct a quiescent operating current although the power dissipation will be increased. Field effect transistors may be used rather than bipolar transistors in the current source 70 and in the buffer amplifier 90. Other changes may be made such as the inclusion of an automatic kinescope bias (AKB) sensing transistor in series with resistor 85. Also, one may include spark gaps at the kinescope cathode and relatively low valued kinescope arc protection resistors may be connected in series with capacitor 100 or, alternatively, such a resistor may be connected between the cathode K1 and the common connection of capacitor 100 and resistor 85.

Figure 5:
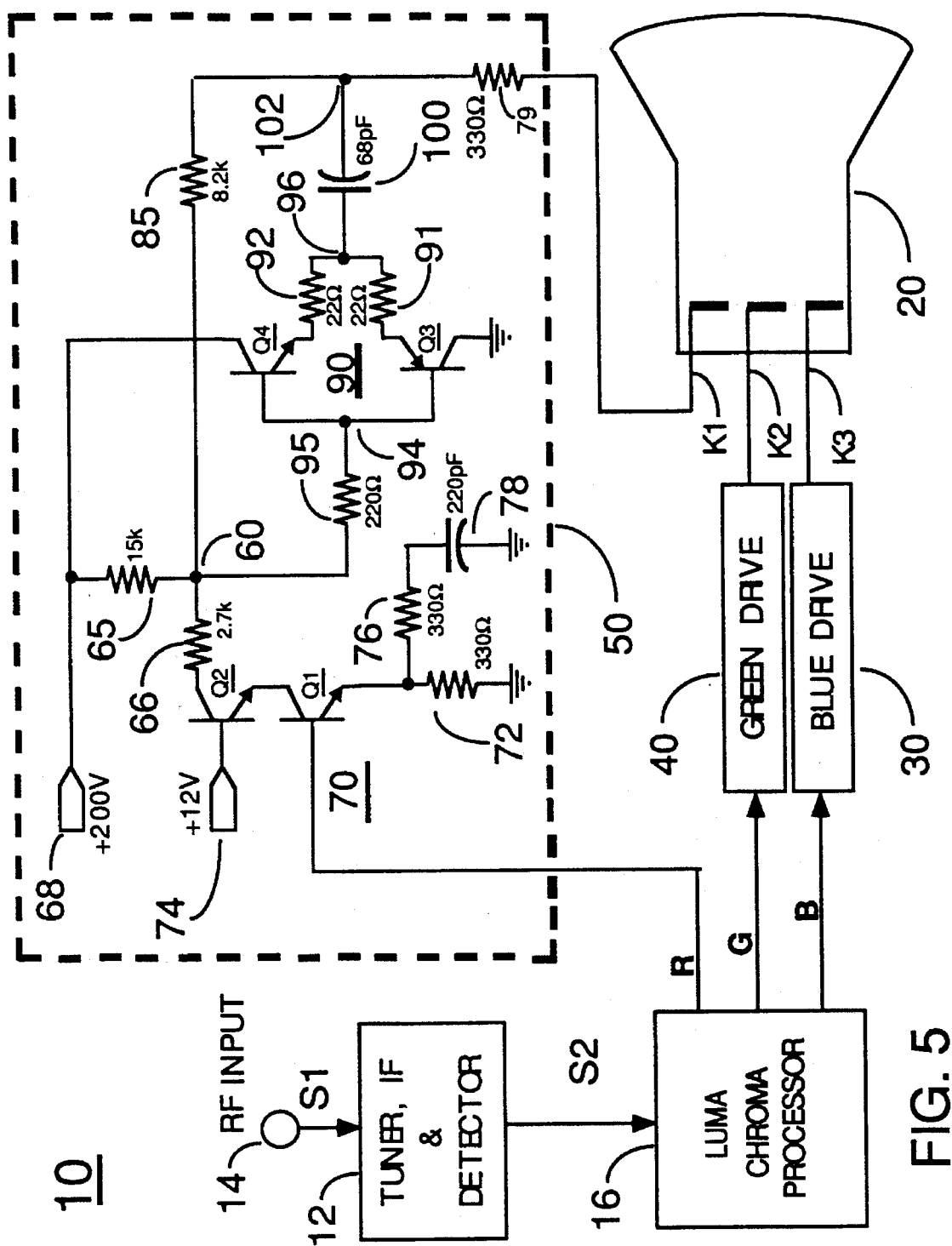

The modification of FIG. 3 shown in the example of FIG. 5 comprises inserting an additional collector load resistor 66 (illustratively, 2.7 k-Ohms) between the collector of transistor Q2 and circuit node 60. Advantageously, this modification enhances the high frequency components of the signal compared with the DC and low frequency components.

What is claimed is:

1. Kinescope driver apparatus, comprising:

a circuit node;

a current source coupled to supply an output current to said circuit node proportional to the value of a video input signal;

a first resistor coupled between said circuit node and a source of supply voltage for developing a high voltage video output signal proportional to a product of said output current of said current source and the value of said first resistor, said high voltage video output signal being of a sufficient value for driving a cathode electrode of said kinescope;

a second resistor coupled between said circuit node and said cathode electrode of said kinescope for coupling said video output signal voltage to said cathode electrode; and a buffer amplifier having an output coupled to said cathode electrode via a capacitor and having an input connected to said circuit node.

2. Apparatus as recited in claim 1 further comprising means for biasing said amplifier to conduct substantially no quiescent current.

3. Apparatus as recited in claim 1 further comprising means for varying the value of said capacitor as a function of beam current of said kinescope.

4. Apparatus as recited in claim 1 further comprising means for varying the value of said capacitor inversely with changes in beam current of said kinescope.

5. Apparatus as recited in claim 1 wherein said capacitor comprises a voltage dependent capacitor.

6. Apparatus as recited in claim 1 wherein said first resistor and said second resistor have a combined resistance value sufficient to impart gamma correction to images displayed by said kinescope.

7. Apparatus as recited in claim 1 wherein the total resistance between said source of supply voltage and said cathode electrode is not less than a sum of the values of said first and second resistors for imparting gamma correction to said kinescope.

8. A method for providing gamma correction, comprising:

generating a current proportional to a video input signal;

applying said current to a first resistor for developing a high video output signal proportional to a product of said current proportional to said video input signal and the value of said first resistor, said high voltage video output signal being of a sufficient level for driving a cathode electrode of said kinescope;

coupling said high voltage video output signal to said cathode electrode of said kinescope via a second resistor; and coupling a first electrode of a capacitor to said cathode electrode and coupling a second electrode of said capacitor to a common connection of said first and second resistors via a buffer amplifier.

9. A method as recited in claim 8 further comprising the step of biasing said amplifier to conduct essentially no quiescent current.

10. A method as recited in claim 8 further comprising the step of varying the value of said capacitor as a function of beam current of said kinescope.

11. A method as recited in claim 8 further comprising the step of varying the value of said capacitor inversely with changes in beam current of said kinescope.

12. A method as recited in claim 8 further comprising the step of selecting, as said capacitor, a diode having a voltage dependent capacitance.

13. A method as recited in claim 8 further comprising coupling one end of said first resistor to a source of supply voltage to provide a source resistance for said cathode of a value not less than the sum of values of the first and second resistors.

* * * * *